United States Patent
Banerjee et al.

(10) Patent No.: US 10,216,536 B2
(45) Date of Patent: Feb. 26, 2019

(54) SWAP FILE DEFRAGMENTATION IN A HYPERVISOR

(71) Applicant: VMware, Inc., Palo Alto, CA (US)

(72) Inventors: Ishan Banerjee, Santa Clara, CA (US); Preeti Agarwal, San Jose, CA (US); Jui-Hao Chiang, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 36 days.

(21) Appl. No.: 15/067,856

(22) Filed: Mar. 11, 2016

(65) Prior Publication Data

US 2017/0262215 A1    Sep. 14, 2017

(51) Int. Cl.
    *G06F 9/455* (2018.01)

(52) U.S. Cl.
    CPC ........... *G06F 9/45558* (2013.01); *G06F 2009/45579* (2013.01); *G06F 2009/45583* (2013.01)

(58) Field of Classification Search
    CPC .... G06F 3/0647; G06F 3/0608; G06F 3/0644; G06F 3/0652; G06F 3/0673; G06F 9/45558; G06F 2009/45583; G06F 3/064; G06F 17/30135; G06F 2206/1004; G06F 2212/1044; G06F 2212/151; G06F 2212/657
    See application file for complete search history.

(56) References Cited

U.S. PATENT DOCUMENTS

| | | | |
|---|---|---|---|
| 5,761,680 A * | 6/1998 | Cohen | G06F 3/0607 |
| 6,038,636 A * | 3/2000 | Brown, III | G06F 12/0246 711/103 |
| 6,715,027 B2 * | 3/2004 | Kim | G06F 12/0246 365/185.11 |
| 2004/0243612 A1* | 12/2004 | Bailey | G06F 17/30312 |
| 2005/0149686 A1* | 7/2005 | Bacon | G06F 12/0269 711/170 |
| 2005/0172271 A1* | 8/2005 | Spertus | G06F 11/3664 717/125 |
| 2005/0273568 A1* | 12/2005 | Blandy | G06F 12/023 711/170 |
| 2008/0235306 A1* | 9/2008 | Kim | G06F 17/30336 |
| 2008/0256104 A1* | 10/2008 | Thelen | G06F 12/10 |
| 2008/0279005 A1* | 11/2008 | France | G06F 12/0246 365/185.11 |
| 2009/0254594 A1* | 10/2009 | Burchall | G06F 17/30135 |
| 2009/0271427 A1* | 10/2009 | Costaglio | G06F 17/30336 |
| 2010/0017556 A1* | 1/2010 | Chin | G06F 12/0246 711/103 |

(Continued)

*Primary Examiner* — Mano Padmanabhan
*Assistant Examiner* — Andrew J Cheong
(74) *Attorney, Agent, or Firm* — Patterson & Sheridan, LLP

(57) ABSTRACT

Memory data for a virtual machine can be stored in a swap file, which is comprised of storage blocks. A defragmentation procedure can be performed on a thin swap file while the virtual machine is still running. The described defragmentation procedure traversing a page frame space of the virtual machine, identifying candidate page frames, relocating the swapped page, and updating the page frame. Resulting unused storage blocks are released to the storage system. A data structure for aiding the defragmentation process is also described.

17 Claims, 5 Drawing Sheets

(56) References Cited

U.S. PATENT DOCUMENTS

| | | | |
|---|---|---|---|
| 2010/0037009 A1* | 2/2010 | Yano | G06F 12/0246 711/103 |
| 2010/0115185 A1* | 5/2010 | Ono | G06F 12/0246 711/103 |
| 2010/0146195 A1* | 6/2010 | Lee | G06F 3/0616 711/103 |
| 2011/0022778 A1* | 1/2011 | Schibilla | G06F 12/0246 711/103 |
| 2011/0055455 A1* | 3/2011 | Post | G06F 12/0246 711/103 |
| 2011/0119455 A1* | 5/2011 | Tsai | G06F 3/0608 711/154 |
| 2011/0283049 A1* | 11/2011 | Kang | G06F 12/0246 711/103 |
| 2012/0233438 A1* | 9/2012 | Bak | G06F 12/0223 711/206 |
| 2012/0284551 A1* | 11/2012 | Zhao | G06F 1/3206 713/323 |
| 2012/0323979 A1* | 12/2012 | Basu | G06F 12/0269 707/813 |
| 2014/0258670 A1* | 9/2014 | Venkatasubramanian | G06F 12/023 711/171 |
| 2015/0169237 A1* | 6/2015 | Ioannou | G06F 3/0679 711/103 |
| 2015/0309736 A1* | 10/2015 | Baskakov | G06F 12/1081 711/165 |
| 2016/0239412 A1* | 8/2016 | Wada | G06F 12/0246 |
| 2017/0123718 A1* | 5/2017 | Sinha | G06F 3/0608 |
| 2017/0269843 A1* | 9/2017 | Yano | G06F 12/0246 |

* cited by examiner

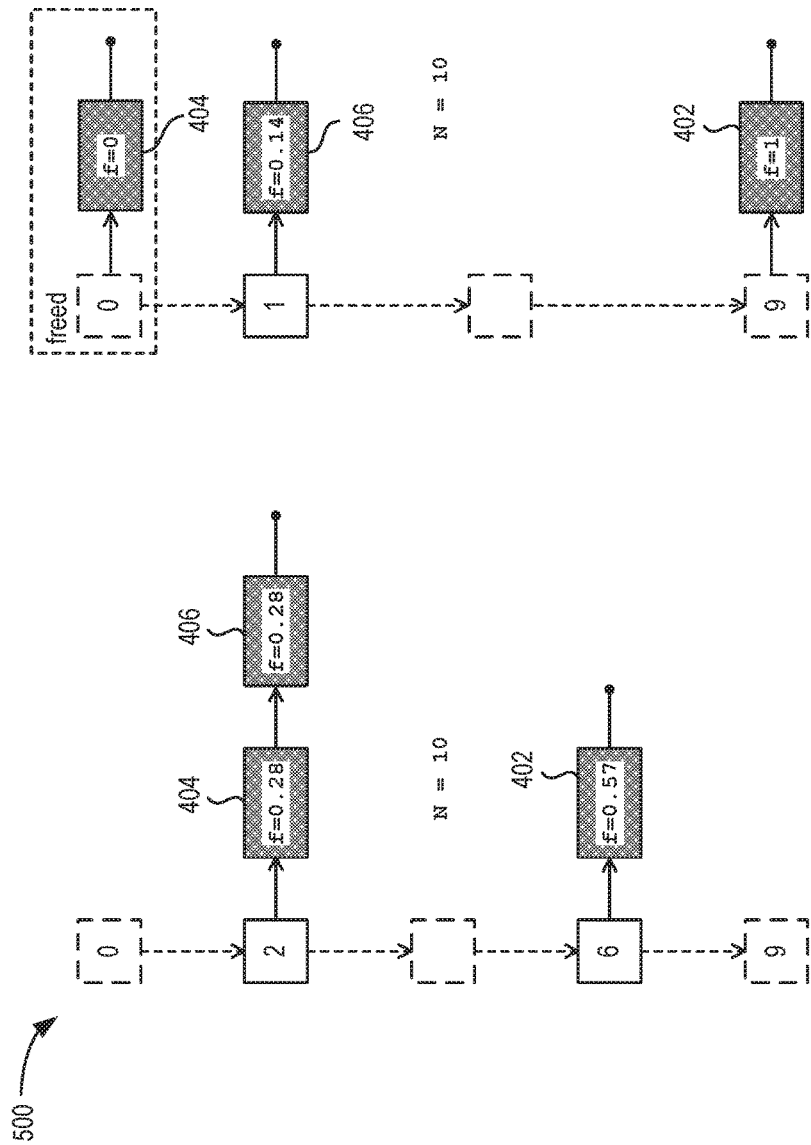

SWAP FILE DEFRAGMENTATION IN A HYPERVISOR

BACKGROUND

Virtual machines (VMs) consume memory and other hardware resources, which are allocated to a VM when the virtual machine is powered on. Powering on a VM includes a number of steps, all of which are to be completed before the VM is considered to have been powered on. As part of the power-on process, a sufficient amount of memory may be allocated to the VM such that the VM will not be terminated due to an insufficient memory reservation in hardware. A sufficient memory reservation may include both a reservation of physical random access memory (RAM) and swap space on a persistent storage device, such as a hard disk drive or a solid state drive.

Memory allocation may utilize a "thick swap" strategy, in which a hypervisor creates a swap space with an initial size equal to a minimum amount of the virtual memory space to be backed by physical memory (RAM and/or persistent storage) and grows the swap space to the virtual memory space size before declaring that a VM has been powered on. If the hypervisor fails to create the swap space and grow the swap space to the virtual memory space size (which may not occur for many minutes), the hypervisor can declare that the VM has failed to boot and release any resources acquired during the power-on operations. Using a thick swap strategy, storage blocks to be swapped into and out of a memory space are guaranteed while the VM operates. In another strategy, known as a "thin swap" strategy, a hypervisor creates a swap space with an initial size equal to a minimum amount of the virtual memory space to be backed by physical memory and declares that a VM has been powered on. In some cases, the hypervisor may fail to acquire storage blocks when memory pages are swapped into the swap space. When such a failure occurs, operation of a VM may be abruptly terminated. While a "thin swap" strategy may result in a VM being powered on more rapidly, a "thin swap" strategy may not provide for reliable operation of a VM.

SUMMARY

One or more embodiments of the present disclosure provide a method that includes storing memory data of a virtual machine executing on a first host in a thin swap file. The thin swap file comprises a plurality of storage blocks including a first storage block and executing a defragmentation procedure on the thin swap file while the virtual machine is powered on. The defragmentation process includes selecting a first memory page frame of the virtual machine having first memory data that has been swapped out to a first storage block of the thin swap file, determining an overall density of the thin swap file and a density of the first storage block, responsive to determining that the density of the first storage block is less than the overall density of the thin swap file, moving the first memory data from the first storage block to a second storage block, and updating the first memory page frame with the location of the first memory data in the second storage block.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

FIGS. 5A and 5B are block diagrams depicting a data structure configured to facilitate the defragmentation process of a powered-on virtual machine, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Swap files for a virtual machine can be organized as "thin" swap files. In contrast to "thick" swap files, which has the entirety of storage blocks allocated at time of creation and remain allocated during the lifetime of the VM, thin swap files allocate storage blocks when required to store memory data from address space of the virtual machine. However, in some scenarios, when the swap storage is no longer needed, the storage blocks of the thin swap file typically remain allocated, which leads to unnecessary and inefficient consumption of storage resources. One or more embodiments of the present disclosure describe a method to defragment a thin swap file of a powered-on (e.g., running) virtual machine to re-organize the thin swap file, and potentially free storage blocks for other use.

Figure 1:
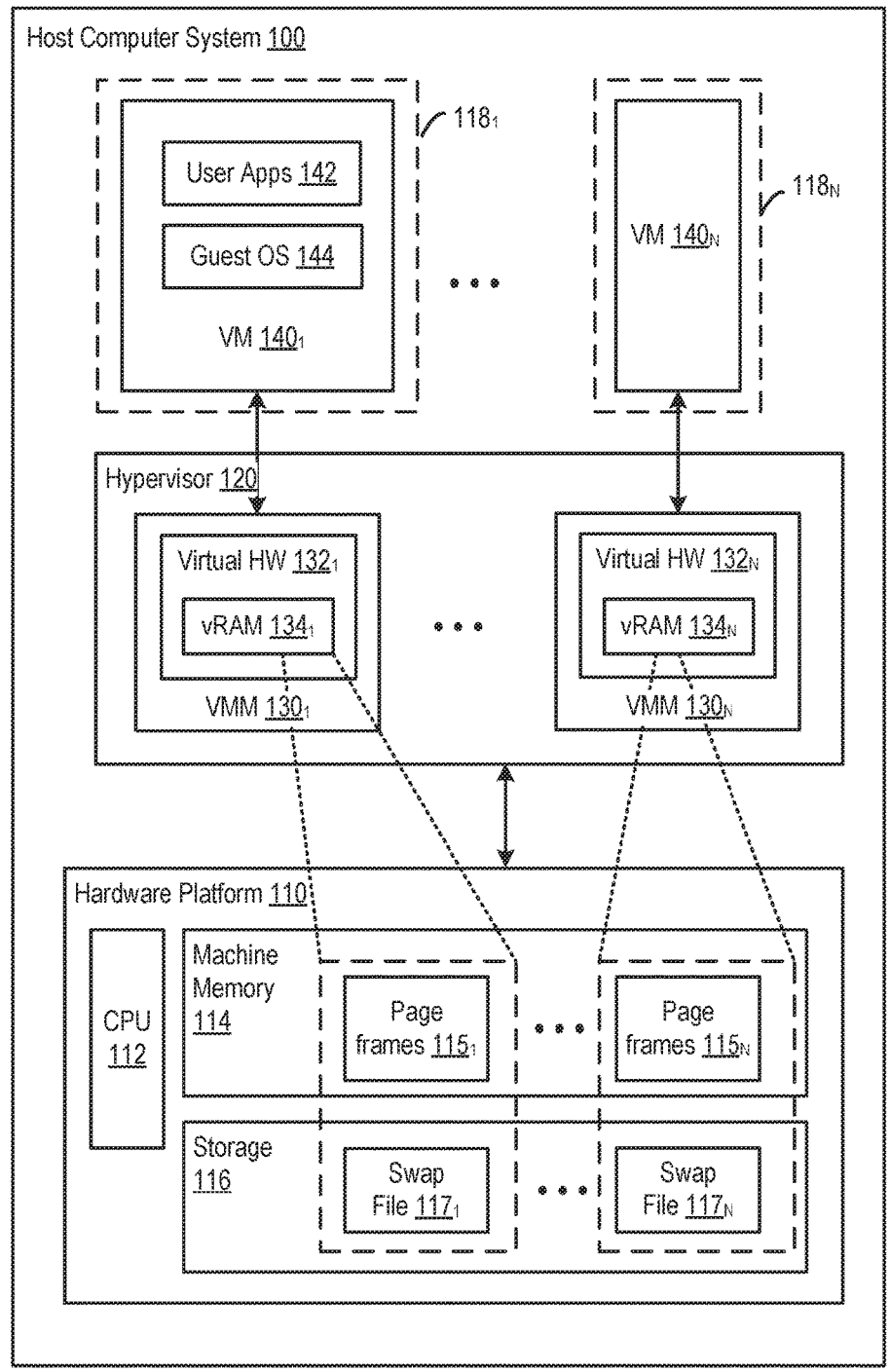
FIG. 1 is a block diagram of a virtualized host computer system that implements iterative swap space growth for rapid VM power-on procedures, according to one or more embodiments.

FIG. 1 is a block diagram of a host computer system 100 configured to perform a swap file defragmentation for a running virtual machine, according to one or more embodiments. The implementation is described herein in the context of a virtualized computing system where the system software is a virtualization software layer (e.g. a hypervisor), which supports execution of virtual computing instances, such as a virtual machine (VM). It should be recognized that other embodiments may be implemented in a computer system where the system software is an operating system.

Host computer system 100 may be constructed on a desktop, laptop, mobile, tablet, or server grade hardware platform 110. Hardware platform 110 includes one or more central processing units (CPU) 112, host machine memory 114, host storage 116, and other standard hardware components such as network interface controllers (not shown) that connect host computer system 100 to a network. Host machine memory 114 may be implemented as a number of banks of random access memory (RAM). Host storage 116 represents one or more local storage devices (e.g., one or more hard disks, flash memory modules, solid state disks, and optical disks) and/or a storage interface that enables host computing system 100 to communicate with one or more network data storage systems. Examples of a storage interface are a host bus adapter (HBA) that couples host computing system 100 to one or more storage arrays, such as a storage area network (SAN) or a network-attached storage (NAS), as well as other network data storage systems.

Hypervisor 120 is also installed on top of hardware platform 110, and provides operating system functionality (e.g., process creation and control, file system, process threads, etc.) as well as CPU scheduling and memory scheduling across multiple VM execution spaces $118_1$-$118_N$ within hypervisor 120. Within each VM execution space $118_1$-$118_N$, a VM process is executed to instantiate corresponding VMs $140_1$-$140_N$. Virtual machine monitors (VMM) $130_1$-$130_N$ implement the virtual system support needed to coordinate operations between hypervisor 120 and their respective VMs $140_1$-$140_N$. Each VMM $130_1$-$130_N$ manages a corresponding virtual hardware platform (i.e., virtual hardware platforms $132_1$-$132_N$) that includes emulated hardware such as virtual CPUs (vCPUs) and guest physical memory. Each virtual hardware platform 132 supports the installation of a guest operating system (OS) 144. In each instance, guest OS 144 provides user applications 142 running in the virtual machine an interface to the virtual hardware platform of the virtual machine.

It should be recognized that the various terms, layers and categorizations used to describe the virtualization components in FIG. 1 may be referred to differently without departing from their functionality or the spirit or scope of the invention. For example, virtual hardware platforms $132_1$-$132_N$ may be considered to be part of virtual machine monitors (VMM) $130_1$-$130_N$. Alternatively, virtual hardware platforms $132_1$-$132_N$ may be considered to be separate (e.g., as a component of its corresponding virtual machine since such platforms include the hardware emulation components for the virtual machine) from VMMs $130_1$-$130_N$, and VMMs $130_1$-$130_N$ may be considered to be separate from hypervisor 120. One example of hypervisor 120 that may be used is included as a component of VMware® vSphere™, which is commercially available from VMware, Inc. of Palo Alto, Calif. It should further be recognized that other virtualized computer systems are contemplated, such as hosted virtual machine systems, where the hypervisor is implemented in conjunction with a host operating system.

Each VM 140 consumes memory based on its configured size, plus additional overhead memory for virtualization. The configured size is a construct maintained by the virtualization layer (i.e., hypervisor and/or VMMs) for the VM, and is the amount of memory that is presented to guest operating system 144. However, the configured size is independent of the amount of physical RAM (i.e., machine memory 114) that is allocated to the virtual machine, which depends on various resource control settings. For example, a first VM $140_1$ may be configured with a configured size of 1 GB. When guest operating system 144 boots, guest OS 144 detects that the guest OS is running on a dedicated machine with 1 GB of physical memory. The actual amount of physical host memory allocated to the virtual machine depends on the VM's memory resource settings and memory contention on the host. In some cases, the virtual machine might be allocated the full 1 GB. In other cases, the virtual machine might receive a smaller allocation. Regardless of the actual allocation, the guest operating system continues to behave as though the guest OS is running on a dedicated machine with 1 GB of physical memory.

Each virtual hardware platform 132 includes a virtual memory 134, also referred to as virtual RAM, vRAM, or guest "physical" memory, usable by the respective VM 140. Virtual memory 134 refers to the memory that is visible to guest OS 144 running in a VM 140, in contrast to "guest virtual memory," which refers to memory that is visible to applications 142 running in a VM 140 and represented as a continuous virtual address space by guest OS 144 to applications 142. When guest OS 144 and user applications 142 execute on VM 140, guest OS 144 and user applications 142 read from and write to the virtual memory, and hypervisor 120 handles translation from the virtual memory to real locations in memory.

In one or more embodiments, virtual memory 134 of an executing VM 140 includes a virtual address space backed by a combination of actual machine memory 114 and swap files in storage 116. The combined use of machine memory and on-disk swap files ensures that the memory pages of the VM have a backing store. That is, at any given moment, a VM's memory page can be backed by 1) RAM, or 2) the swap file. In one embodiment, the virtual address space of virtual memory 134 is mapped to one or more locations in host machine memory 114, referred to as page frames. In some cases (e.g., memory over-commitment), memory data in the virtual memory space can be stored in one or more locations in host storage 116, referred to as swap space or swap file 117. Swap file(s) 117 (i.e., $117_1$-$117_N$) can be implemented as one or more files designated exclusively on a per-VM basis, or a shared configuration, stored in host storage 116. In one common scenario, page frames 115 in machine memory 114 is used to store a number of recently used memory pages, while swap file 117 is used to store the remainder of the virtual memory space. Based on memory usage of guest OS 144 or application 142, memory management functionality in hypervisor 120 or CPU 112 is configured to swap memory data between page frames 115 in machine memory and swap file 117 in storage. For example, when guest OS 144 or a user application 142 attempts to access a memory page that is not stored in a page frame 115 in machine memory 114, hypervisor 120 can swap in memory data from the swap file into a corresponding page frame 115 in machine memory.

In one or more embodiments, swap file(s) 117 are organized as "thin" swap files. When a VM 140 is powered on, hypervisor 120 creates a thin swap file, but storage blocks are not allocated to the swap file at this time. In contrast to "thick" swap files, which has the entirety of storage blocks allocated at time of creation and remain allocated during the lifetime of the VM, thin swap files allocate storage blocks when required to store memory data from page frames 115. That is, a storage block in storage 116 is allocated when hypervisor 120 needs to swap out a memory page from the VM's page frame backing store (i.e., physical RAM) into the swap file. If hypervisor 120 swaps in a memory page from the swap file into the VM's page frame backing store, the storage block is traditionally not freed at that time. As a result of repeated swap-out and swap-in operation of guest memory pages into different parts of the swap file, the swap file may become internally fragmented.

FIGS. 2A to 2D are block diagrams illustrating multiple states of a virtual memory address space 134 backed by a plurality of page frames 115 and a thin swap file 117, according to one embodiment of the present disclosure. At a first state 200, depicted in FIG. 2A, a VM 140 is powered on, and hypervisor 120 creates a thin swap file 117 with no allocated storage blocks, which is graphically represented in the Figures using a thin line. The created thin swap file may have a configured size swapsz, which is graphically represented by the line having a length approximately equal to the size of page frames 115. The value of swapsz depends on a variety of memory resource management parameters, such as memory reservation.

Figure 2A:
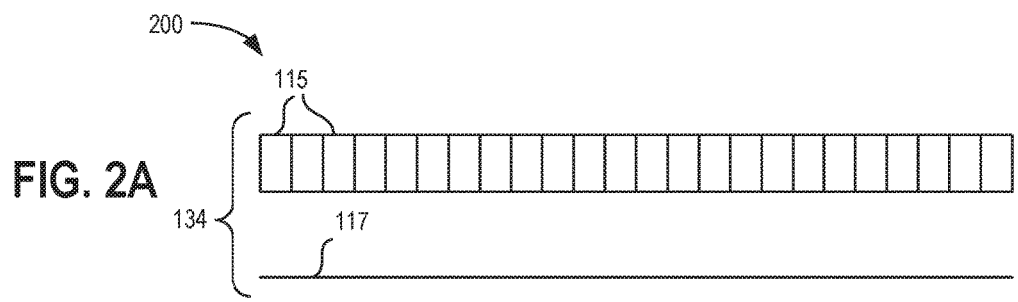
FIGS. 2A to 2D are block diagrams illustrating multiple states of a virtual memory address space backed by page frames and a thin swap file, according to one embodiment of the present disclosure.
Figure 2B:
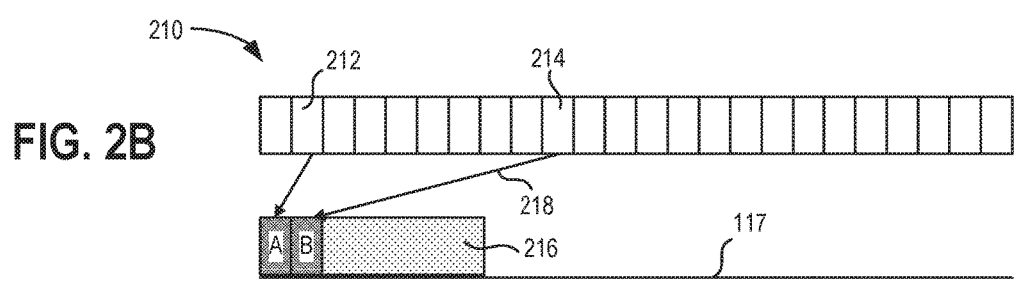

FIG. 2B depicts a second state 210, in which hypervisor 120 has swapped out guest memory pages from the powered-on VM into swap file 117. This action has resulted in the allocation of a storage block 216. The unit of a storage block 216 may be larger than the size of a memory page. For example, a single storage block 216 could be sized to contain seven (7) memory pages (other sizes may be used). In the example shown, two memory pages 212, 214 are swapped out and stored in storage block 216 as pages A, B in the swap file. The remaining portion of storage block 216 is allocated but unused. Memory pages 212, 214 contains a mapping 218 from page frame to swapped block indicating that the memory data in those pages have been swapped out (graphically represented as a directional arrow).

Figure 2C:
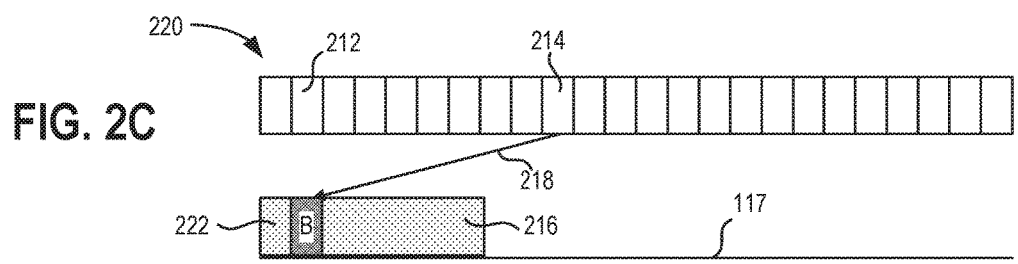

FIG. 2C depicts a third state 220, in which hypervisor 120 has swapped in one memory page from the swap file at A, creating another unused region 222 in the swap file. Storage block 216 remains allocated after the swap-in completes. Storage block 216 cannot be freed after the swap-in because another memory page (B) is still occupying space on that storage block, as a consequence of the unit of storage block being larger than the size of a guest memory page.

Figure 2D:
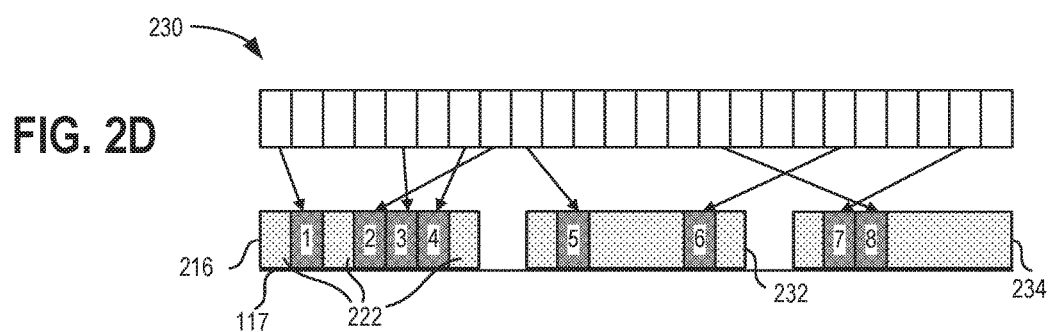

FIG. 2D depicts a fourth state 230 of thin swap file 117 after repeated swap-in and swap-out operations. As shown, many pages from the VM have been swapped out, and hypervisor 120 has allocated additional storage blocks 232, 234 to accommodate the swapped out pages. Subsequently, some VM memory pages have been swapped in from the swap file. Allocated but unused storage space (e.g., region 222) in blocks 216, 232, 234 has caused internal fragmentation and wastage of storage resources.

One approach to reduce internal fragmentation of thin swap file 117 would be to move swapped pages from a set of selected storage blocks into other storage blocks. The selected storage blocks now would not contain swapped pages and could be released back to the storage system (storage 116). In one implementation of this approach, hypervisor 120 would check each storage block and swapped VM pages (e.g., pages 1, 2, 3, 4, 5, 6, 7, 8, in that order) in those storage blocks, determine if the swapped pages would need to be moved from that block, and move the swapped pages into another suitable storage block. However, this approach may not be applied for a swap file of a powered-on virtual machine. Specifically, the process of moving the swapped pages into another suitable storage block would require updating the page frame of the VM pages that are to be moved in the swap file because the running VM might seek access to that page frame. However, there is no mapping from the swapped page in the swap file back to the corresponding page frame. That is, owing to the absence of backmaps from swapped pages to page frames, a traversal along the swap file space may not be possible. Hence, traditional defragmentation and compaction logic is not applicable to swap files of powered-on VMs.

Accordingly, one or more embodiments of the present disclosure describe a method to defragment a thin swap file of a powered-on (e.g., running) virtual machine by traversing the page frame space. At the end of the defragmentation process, all swapped out VM pages are clustered together, using fewer storage blocks. Storage blocks that are freed of swapped out VM pages are then released back to the storage system, reducing storage consumption and raising storage consolidation The described process may be performed as a one-pass algorithm, executing as a single pass over the page frames of the virtual machine.

Figure 3:
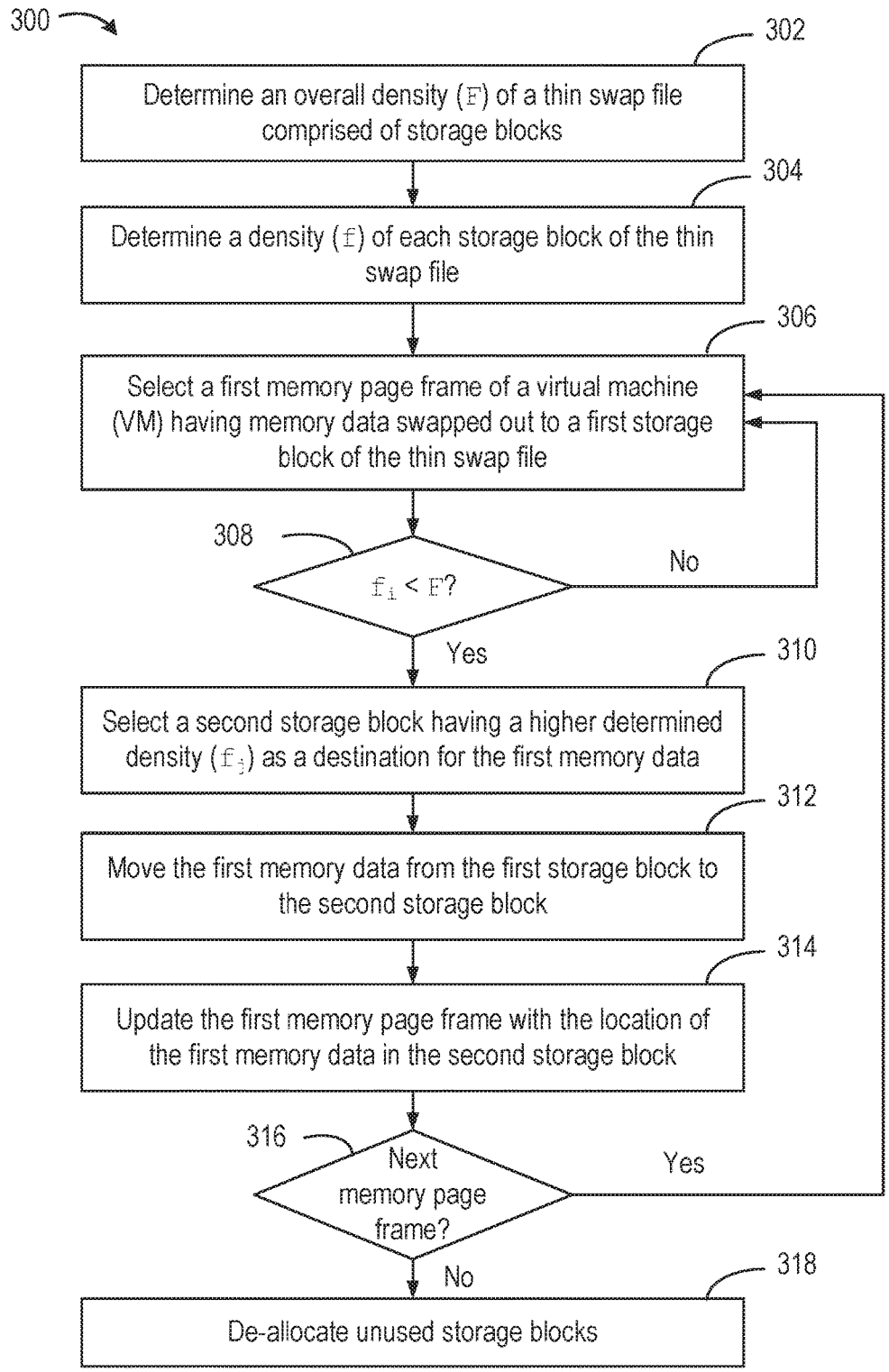
FIG. 3 is a flow diagram depicting a method for defragmenting a thin swap file of a powered-on virtual machine, according to one embodiment of the present disclosure.

FIG. 3 is a flow diagram depicting a method 300 for defragmenting a thin swap file of a powered-on virtual machine, according to one embodiment of the present disclosure. In one embodiment, hypervisor 120 has stored memory data of a virtual machine 140 executing on a host 100 in a thin swap file 117. Thin swap file 117 includes a plurality of storage blocks 216. Hypervisor 120 executes a defragmentation procedure of method 300 on thin swap file 117 while the virtual machine is running. While method 300 is described in conjunction with the system depicted in FIG. 1, it should be understood that method 300 may be performed by other systems.

Method 300 begins at step 302, where hypervisor 120 determines an overall density of a thin swap file 117 having a plurality of storage blocks. As used herein, the overall density of a thin swap file refers to the file-wide fraction F of storage space that is allocated and used in the thin swap file. Storage blocks 216 that contain less than F fraction of swapped pages can be characterized as candidate blocks that can be freed of swapped pages and released back to the storage system. The calculated overall density may be stored in one or more data structures maintained by hypervisor 120, and updated in response to changes to the thin swap file (e.g., swap-in, swap-out operations).

Hypervisor 120 may determine the overall density based on one or more performance and status metrics maintained by hypervisor 120 and related to the performance and operation of VM 140. In one particular implementation, hypervisor 120 calculates the overall density (F) as the ratio of the number of page frames that are swapped out in the thin swap file to the number of VM pages that can be stored in one storage block and the number of storage blocks currently allocated for the thin swap file, as represented in Equation (1) below.

$$F=\text{swapped\_pages}/(\text{pages\_per\_block}*\text{num\_blocks}) \quad (1)$$

It should be understood that other formulations of the overall density may be used, including using actively maintained metrics, derived metrics, or a combination of both. For example, in an alternative embodiment, hypervisor 120 may determine the overall density based on a first metric indicating the amount of memory data that have been swapped out to the thin swap file (e.g., 600 MB) and a second metric indicating the amount of storage blocks have been allocated to the thin swap file (e.g., 1 GB).

At step 304, hypervisor 120 determines a density of each storage block allocated to the thin swap file. As used herein, the density of a storage block refers to the per-block fraction of storage space that is allocated and used by swapped-out VM pages. Similar to step 302, hypervisor 120 determines the density of each storage block 216 based on performance metrics and configuration settings maintained by hypervisor 120. In one particular implementation, hypervisor 120 calculates the density ($f_i$) of each storage block i as a ratio of the number of page frames that are swapped out to a block i of the thin swap file to the number of VM pages that can be stored in one storage block 216, as represented in Equation (2) below.

$$f_i=\text{swapped\_pages}/\text{pages\_per\_block} \quad (2)$$

While steps 302 and 304 of method 300 are discussed as active steps performed within the defragmentation process, certain embodiments may regularly or asynchronously perform steps 302, 304 during normal operations of hypervisor 120. That is, the overall density of the thin swap file and density of each storage block may be maintained and updated in response to swap-in and swap-out operations. In some embodiments, hypervisor 120 generates and maintains an ordered list of the storage blocks 216 based on a corresponding density of each storage block. In some embodiments, hypervisor 120 maintains of list of storage blocks 216 having the highest values of fraction f. It should be understood that other formulations of the density of each storage block may be used, including using actively maintained metrics, derived metrics, or a combination of both. In some embodiments, the density of each storage block may be approximated for simplicity and ease of implementation, as described in greater detail in conjunction with FIG. 5 below.

At step 306, hypervisor 120 selects a memory page frame of the powered-on virtual machine having memory data swapped out to a storage block of the thin swap file. In one implementation, hypervisor 120 checks a first page frame in the virtual machine's address space. Responsive to determining that the page frame indicates the corresponding VM's memory page has been swapped out, then hypervisor 120 checks the storage block containing that VM page.

At step 308, hypervisor 120 determines whether that the density ($f_i$) of the first storage block is less than the overall density (F) of the thin swap file. If so, then the swapped VM page for the first page frame is selected as a candidate for relocation to another storage block. Otherwise, the hypervisor 120 may return to step 306 and check another memory page frame of the powered-on VM.

At step 310, responsive to determining that the density of the first storage block is less than the overall density of the thin swap file, hypervisor 120 selects a second storage block as a destination for the first memory data of the selected first memory page frame. In some embodiments, hypervisor 120 selects a destination storage block having a higher determined density ($f_j$) relative to the density of first storage block. In other embodiments, hypervisor 120 selects a destination storage block having a highest density, i.e., the highest value off among the plurality of storage blocks 216 of the thin swap file.

At step 312, hypervisor 120 moves the first memory data of the selected first memory page from the first storage block to the new destination storage block (selected in step 310). At step 314, hypervisor 120 may update the first memory page frame with the location of the first memory data in the second storage block. In some embodiments, hypervisor 120 updates the page frame with a new offset number corresponding to the location of the first memory data within the second storage block, thereby replacing the old mapping to the first storage block.

In some embodiments, the relocation of a swapped VM page from one storage block to another may require reading that VM page temporarily into a memory page. Page faults from the VM during this interval will result in the page being retained in-memory and abandoning relocation for that VM page.

At step 316, hypervisor 120 determines if there is a next (i.e., additional) memory page frame to evaluate for defragmentation. If so, hypervisor 120 returns to step 306 to check another memory page frame of the powered-on VM. Accordingly, hypervisor 120 may perform steps 306 through 314 of method 300 at least once for all page frames in the powered-on VM's address space. In some embodiments, the steps 306 through 314 may be executed in batches, of suitable length, to help amortize the time cost of storage I/O operations. For example, if steps 306 through 310 are notated as an operation A and step 312 through 314 are notated as an operation B, hypervisor 120 may execute steps in batches as indicated in the following sequence: (A, A, B, B, A, A, B, B), or in another example, (A, A, A, B, B, B), and so on.

At the end of the defragmentation process, all unused but allocated space has been consolidated on a set of storage blocks. At step 318, hypervisor 120 may de-allocated these unused storage blocks and release the blocks back to the storage system (e.g., storage 116).

Figure 4A:
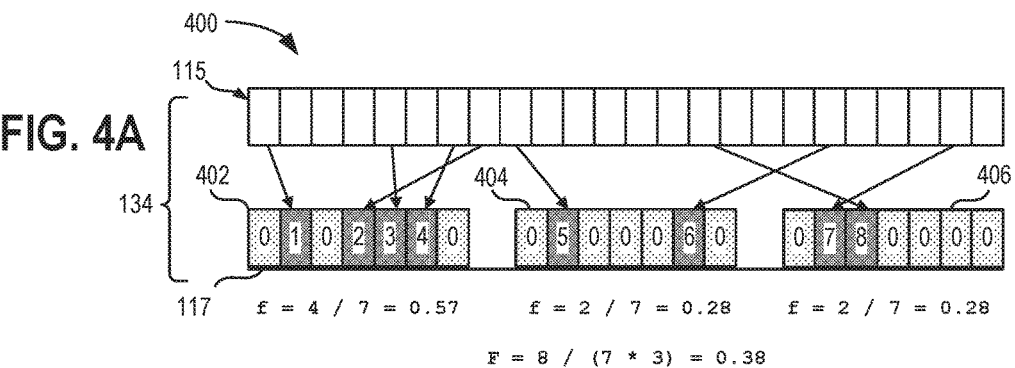
FIGS. 4A to 4D are block diagrams illustrating multiple states of a virtual memory address space backed by page frames and a thin swap file during one embodiment of the present disclosure.

FIGS. 4A to 4D are block diagrams illustrating multiple states of a virtual memory address space 134 backed by a plurality of page frames 115 and a thin swap file 117 during one embodiment of the described defragmentation process. FIG. 4A depicts an initial fragmented state 400, in which VM 140 has been running and has performed numerous swap-in and swap-out operations. For continuity of explanation, the state of the thin swap file and page frames is similar to that depicted in state 230 in FIG. 2D.

Thin swap file 117 has three allocated storage blocks 402, 404, 406 storing a plurality of swapped out pages stored in thin swap file 117. In the example shown, allocated but unused storage space in blocks 402, 404, and 406 are empty regions available for swapping out VM pages and represent internal fragmentation in thin swap file 117. Specifically, the three storage blocks 402, 404, 406 contain a total of eight (8) swapped out pages (labelled "1" through "8") and unused space for thirteen (13) memory pages (labelled "0"). Assuming each storage block can store seven (7) swapped memory pages, hypervisor 120 calculates the overall density F using Equation (1), as 0.38 (i.e., F=8/(7*3)=0.38). Hypervisor 120 determines that storage blocks 402, 404, 406 contain four (4), two (2), and two (2) swapped out VM pages, respectively, and calculates the per-block density for the storage blocks as 0.57, 0.28, and 0.28, respectively.

Figure 4B:
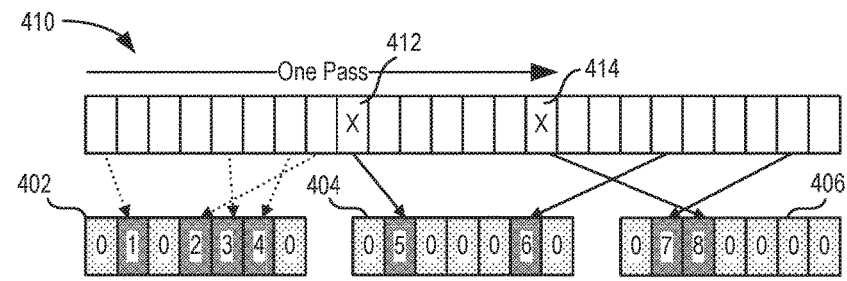

FIG. 4B illustrates a second state 410, in which hypervisor 120 performs a one-pass walk along the page frame space 115 of the powered-on VM. Hypervisor 120 traverses the page frame space to identify target frames for relocation. For each page frame 115 that contains a swapped out page, the corresponding storage block containing that page is checked. If the corresponding storage block satisfies the condition (f<F), then the page frame is selected as a candidate for relocation. Page frames with swapped pages are selected and their page frames are marked with the label "X". In the iteration shown in FIG. 4B, page frames 412, 414 with swapped pages in 5 and 8 are selected responsive to determining that the per-block densities of storage blocks 404, 406 (f=0.28) is less than the file-wide density of the thin swap file (F=0.38). Mappings for storage block 402 are depicted in dotted lines for clarity of illustration.

Figure 4C:
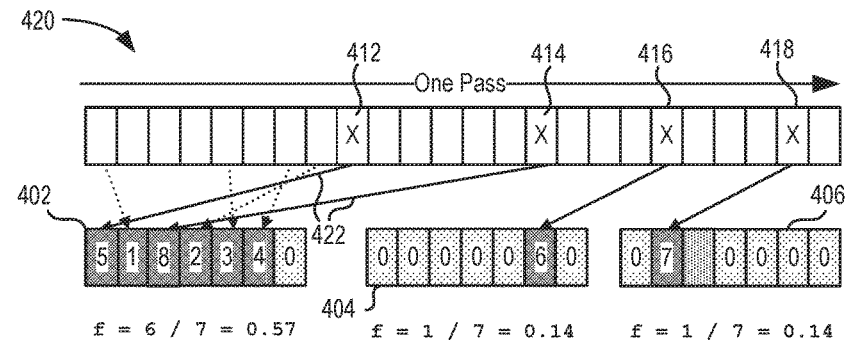

FIG. 4C illustrates a third state 420, in which pages selected for relocation have been relocated to a different storage block having a high value of per-block density (f). Specifically, the pages in 5 and 8 have been relocated to the empty regions in storage block 402, and the page frames 412, 414 have been updated with the new location of the swapped pages, as depicted by new mappings 422. In some embodiments, the relocation of swapped pages to different storage blocks may trigger an update to the per-block density calculations for those storage blocks (f=1/7=0.14). For the next iteration, hypervisor 120 selects page frames 416, 418 with swapped pages in 6 and 7 for relocation based on a comparison of the per-block density to the file-wide density.

Figure 4D:
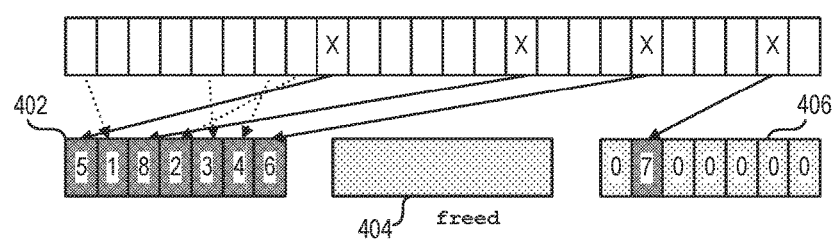

FIG. 4D illustrates a fourth state 430, in which all pages selected for relocation have been relocated to a different storage block having a high value of per-block density (f). In the example shown, the page frame for swapped page 7 was not relocated because there were no suitable target storage blocks. Storage block 402 has no remaining space for swapped pages (f=1.0) and no other storage blocks have a higher calculated per-block density. In addition to relocating the swapped pages, the corresponding page frames have been updated with the new location of the swapped pages. This step is made possible since the one-pass walk is being performed along the page frame space, rather than the storage block space. That is, the defragmentation process of swapped pages is performed according to the sequence of memory pages in the VM's page frame space and not the sequence in storage (notably, page 8 was relocated before page 6). The resulting thin swap file in state 430 contains one fully unused storage block 404. This storage block, labelled "freed" in FIG. 4D, can now be released to the storage system, thereby saving storage space.

As discussed above, the metric f indicates the fraction of a storage block that contains swapped-out VM pages. For example, in FIG. 4A, the three storage blocks have an f value of 0.57, 0.28, and 0.28, respectively. The selection of a destination storage block (i.e., step 310 of method 300) can be implemented by selecting a storage block with the highest value of per-block density f. In one or more embodiments, this heuristic can be approximated by selecting a storage block with a (merely) high value of f.

FIGS. 5A and 5B are block diagrams depicting a data structure configured to facilitate the defragmentation process of a powered-on virtual machine, according to one embodiment of the present disclosure. In one embodiment, the data structure includes a set 500 of lists of a plurality of storage blocks allocated to the thin swap file. Each list in the set of lists corresponds to a (different) level of per-block density of a storage block. In operation, hypervisor 120 may select a storage block (as a destination for a relocating memory page) from among the storage blocks included in the list corresponding to a highest level of density.

In one particular embodiment, hypervisor 120 maintains a set 500 of N lists, say, labelled 0, . . . , N–1, of storage blocks. The hypervisor maintains the list such that ith list contains all the storage blocks satisfying the condition in Equation (3) below.

$$i * \frac{1}{N} \leq f < (i+1) * \frac{1}{N} \text{ for } i \in 0, \ldots, N-1 \quad (3)$$

For example, consider storage blocks 402, 404, 406 from FIG. 4A having per-block density f=0.57, 0.28, and 0.28, respectively. Assuming hypervisor 120 generates a set of ten lists (N=10), the list "2" contains storage blocks 404, 406 having per-block density of 0.28 each, and the list "6" contains storage block 402 having the per-block density of 0.57. Other embodiments may have more or fewer lists (N) in set 500 for finer or coarser granularity at each level of storage block density. For example, maintaining a set of three lists would support approximation of a "high" level of per-block density (i=2), a "low" level of per-block density (i=1), or an empty block (i=0).

FIG. 5B illustrates an updated state of set 500 of lists of storage blocks after the defragmentation process has been performed to the thin swap file. As shown, hypervisor 120 has updated each list to enforce the condition described in Equation (3). Specifically, storage block 406 having the updated per-block density value of f=0.14 has been moved from list "2" to list "1", and storage block 402 having the updated per-block density value of f=1.0 has been moved from list "6" to the list "9" in set 500. Meanwhile, storage block 404 is completely unused (f=0) and has been moved to the list 0. In some embodiments, after defragmentation, hypervisor 120 de-allocates and releases any storage blocks contained in the list 0.

Hypervisor 120 is configured to maintain set 500 of lists during normal operations and execution of the virtual machine. In some embodiments, responsive to swapping out a memory page frame into a storage block of the thin swap file, hypervisor 120 is configured to update ordered list to move the storage block to a higher corresponding sequence in the ordered list. In some embodiments, responsive to swapping in a memory page frame from a storage block of the thin swap file, hypervisor 120 is configured to update the ordered list to move the storage block to a lower corresponding sequence in the ordered list. That is, when a VM page is swapped out into a storage block, the storage block is moved to an appropriate higher numbered list. Similarly, when a VM page is swapped in from a storage block, the storage block is moved to an appropriate lower numbered list.

To facilitate defragmentation of a thin swap file of a powered-on VM, hypervisor 120 uses storage blocks from the higher-numbered lists from set 500 when selecting a destination storage block for a relocating memory page. Set 500 of lists can also be used to avoid fragmentation of the thin swap file during execution of the virtual machine. In some embodiments, hypervisor 120 is configured to direct swap-outs into storage blocks from higher-numbered lists in set 500, rather than simply choosing a next available storage space in the last storage block as done in conventional techniques. Such selection of swap-outs proactively maintains a low fragmentation of the thin swap file by not swapping into new storage blocks until required.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method, comprising:
    creating a swap file for storing memory data of a virtual machine executing on a first host, wherein the swap file comprises a plurality of storage blocks including a first storage block;
    executing a defragmentation procedure on the swap file while the virtual machine is powered on, the defragmentation procedure comprising:
        selecting a first memory page frame of the virtual machine having first memory data that has been swapped out to the first storage block of the swap file;
        determining an overall density of the swap file based on a first ratio of a first number of memory page frames stored in the swap file to a second number of memory pages for which space is allocated in the swap file;
        determining a density of the first storage block based on a second ratio of a third number of memory page frames stored in the first storage block to a fourth number of memory pages for which space is allocated in the first storage block;
        responsive to determining that the density of the first storage block is less than the overall density of the swap file, moving the first memory data from the first storage block to a second storage block; and
        updating the first memory page frame with a location of the first memory data in the second storage block.

2. The method of claim 1, wherein the defragmentation procedure comprises:
    responsive to moving the first memory data from the first storage block to the second storage block and determining that the first storage block contains no swapped pages, deallocating the first storage block from the swap file.

3. The method of claim 1, further comprising:
    selecting the second storage block as a destination for the first memory data based on a determination that the second storage block has a highest calculated density among the plurality of storage blocks.

4. The method of claim 1, further comprising:
    generating an ordered list of the plurality of storage blocks based on a corresponding density of each storage block; and
    selecting the second storage block as a destination for the first memory data according to the ordered list.

5. The method of claim 4, further comprising:
    responsive to swapping out a memory page frame into the second storage block of the swap file, updating the ordered list to move the second storage block to a higher corresponding sequence in the ordered list; and
    responsive to swapping in a memory page frame from the second storage block of the swap file, updating the ordered list to move the second storage block to a lower corresponding sequence in the ordered list.

6. The method of claim 1, further comprising:
    generating a set of lists of the plurality of storage blocks, each list in the set of lists corresponding to a level of density, wherein the set of lists includes a first list having a highest level of density; and
    selecting the second storage block as a destination for the first memory data based on inclusion of the second storage block in the first list.

7. The method of claim 1, further comprising:
    responsive to a request to swap out second memory data for the virtual machine to the swap file, selecting the second storage block as a destination for the second memory data based on a calculated density of the second storage block.

8. The method of claim 1, wherein the defragmentation procedure is executed using a single pass of a plurality of memory page frames of the virtual machine.

9. A computer system comprising:
    one or more processors executing a first virtual machine;
    a memory comprising a plurality of page frames associated with the first virtual machine; and
    a storage device storing memory data of the first virtual machine in a swap file, wherein the swap file comprises a plurality of storage blocks including a first storage block, wherein the processor is configured to defragment the swap file while the first virtual machine is powered on by performing a defragmentation method comprising:

selecting a first memory page frame of the virtual machine having first memory data that has been swapped out to the first storage block of the swap file;

determining an overall density of the swap file based on a first ratio of a first number of memory page frames stored in the swap file to a second number of memory pages for which space is allocated in the swap file;

determining a density of the first storage block based on a second ratio of a third number of memory page frames stored in the first storage block to a fourth number of memory pages for which space is allocated in the first storage block;

responsive to determining that the density of the first storage block is less than the overall density of the swap file, moving the first memory data from the first storage block to a second storage block; and updating the first memory page frame with a location of the first memory data in the second storage block.

10. The computer system of claim 9, wherein the defragmentation method further comprises:

responsive to moving the first memory data from the first storage block to the second storage block and determining that the first storage block contains no swapped pages, deallocating the first storage block from the swap file.

11. The computer system of claim 9, wherein the defragmentation method further comprises:

selecting the second storage block as a destination for the first memory data based on a determination that the second storage block has a highest calculated density among the plurality of storage blocks.

12. The computer system of claim 9, wherein the defragmentation method further comprises:

generating an ordered list of the plurality of storage blocks based on a corresponding density of each storage block;

selecting the second storage block as a destination for the first memory data according to the ordered list;

responsive to swapping out a memory page frame into the second storage block of the swap file, updating the ordered list to move the second storage block to a higher corresponding sequence in the ordered list; and responsive to swapping in a memory page frame from the second storage block of the swap file, updating the ordered list to move the second storage block to a lower corresponding sequence in the ordered list.

13. The computer system of claim 9, wherein the defragmentation method further comprises:

generating a set of lists of the plurality of storage blocks, each list in the set of lists corresponding to a level of density, wherein the set of lists includes a first list having a highest level of density; and selecting the second storage block as a destination for the first memory data based on inclusion of the second storage block in the first list.

14. The computer system of claim 9, wherein the defragmentation method file further comprises:

responsive to a request to swap out second memory data for the virtual machine to the swap file, selecting the second storage block as a destination for the second memory data based on a calculated density of the second storage block.

15. A non-transitory computer readable medium comprising instructions that, when executed by a processor, performs an operation comprising:

creating a swap file for storing memory data of a virtual machine executing on a first host, wherein the swap file comprises a plurality of storage blocks including a first storage block;

executing a defragmentation procedure on the swap file while the virtual machine is powered on, the defragmentation procedure comprising:

selecting a first memory page frame of the virtual machine having first memory data that has been swapped out to the first storage block of the swap file;

determining an overall density of the swap file based on a first ratio of a first number of memory page frames stored in the swap file to a second number of memory pages for which space is allocated in the swap file;

determining a density of the first storage block based on a second ratio of a third number of memory page frames stored in the first storage block to a fourth number of memory pages for which space is allocated in the first storage block;

responsive to determining that the density of the first storage block is less than the overall density of the swap file, moving the first memory data from the first storage block to a second storage block; and updating the first memory page frame with a location of the first memory data in the second storage block.

16. The non-transitory computer readable medium of claim 15, wherein the defragmentation procedure further comprises:

responsive to moving the first memory data from the first storage block to the second storage block and determining that the first storage block contains no swapped pages, deallocating the first storage block from the swap file.

17. The non-transitory computer readable medium of claim 15, wherein the method further comprises:

generating an ordered list of the plurality of storage blocks based on a corresponding density of each storage block; and selecting the second storage block as a destination for the first memory data according to the ordered list.

* * * * *